United States Patent
Pamuru

(10) Patent No.: US 11,488,371 B2
(45) Date of Patent: Nov. 1, 2022

(54) MACHINE LEARNING ARTIFICIAL INTELLIGENCE SYSTEM FOR PRODUCING 360 VIRTUAL REPRESENTATION OF AN OBJECT

(71) Applicant: Sudheer Kumar Pamuru, Frisco, TX (US)

(72) Inventor: Sudheer Kumar Pamuru, Frisco, TX (US)

(73) Assignee: Concat Systems, Inc., Urbandale, IA (US)

( * ) Notice: Subject to any disclaimer, the term of this patent is extended or adjusted under 35 U.S.C. 154(b) by 0 days.

(21) Appl. No.: 17/125,271

(22) Filed: Dec. 17, 2020

(65) Prior Publication Data

US 2022/0198769 A1 Jun. 23, 2022

(51) Int. Cl.
| | |
|---|---|
| G09G 5/00 | (2006.01) |
| G06T 19/20 | (2011.01) |
| G06T 15/20 | (2011.01) |
| G06T 7/194 | (2017.01) |
| G06N 20/00 | (2019.01) |
| G06T 7/00 | (2017.01) |

(52) U.S. Cl.
CPC ............ G06T 19/20 (2013.01); G06N 20/00 (2019.01); G06T 7/0004 (2013.01); G06T 7/194 (2017.01); G06T 15/205 (2013.01); G06T 2207/20081 (2013.01); G06T 2207/30252 (2013.01); G06T 2219/2016 (2013.01)

(58) Field of Classification Search
None
See application file for complete search history.

(56) References Cited

U.S. PATENT DOCUMENTS

| | | | |
|---|---|---|---|
| 5,852,672 | A | 12/1998 | Lu |
| 6,134,564 | A | 10/2000 | Listou |
| 6,795,113 | B1 | 9/2004 | Jackson et al. |
| 6,965,324 | B1 | 11/2005 | Suggs, Sr. |

(Continued)

FOREIGN PATENT DOCUMENTS

| | | |
|---|---|---|
| WO | 2000062542 A1 | 10/2000 |
| WO | 2001903199 A1 | 12/2001 |

OTHER PUBLICATIONS

Singh et al., Automating Car Insurance Claims Using Deep Learning Techniques, 2019, IEEE Fifth International Conference on Multimedia Big Data (BigMM), pp. 199-207 (Year: 2019).*

(Continued)

*Primary Examiner* — Anh-Tuan V Nguyen
(74) *Attorney, Agent, or Firm* — Brett J. Trout

(57) ABSTRACT

The present disclosure is directed to automatically generating a 360 Virtual Photographic Representation ("spin") of an object using multiple images of the object. The system uses machine learning to automatically differentiate between images of the object taken from different angles. A user supplies multiple images and/or videos of an object and the system automatically analyzes and classifies the images into the proper order before incorporating the images into an interactive spin. The system automatically classifies the images using features identified in the images. The classifications are based on predetermined classifications associated with the object to facilitate proper ordering of the images in the resulting spin.

4 Claims, 14 Drawing Sheets

(56) References Cited

U.S. PATENT DOCUMENTS

| | | | |
|---|---|---|---|
| 7,106,348 B2 | 9/2006 | Matsumoto | |
| 7,149,367 B2 | 12/2006 | Cutler | |
| 7,567,274 B2 | 7/2009 | Ekpar | |
| 7,882,258 B1 | 2/2011 | Sumler et al. | |
| 8,353,406 B2 | 1/2013 | Sumler et al. | |
| 8,503,826 B2 | 8/2013 | Klimenko | |
| 8,913,847 B2 | 12/2014 | Tang et al. | |
| 9,443,153 B1 | 9/2016 | Gupla et al. | |
| 9,619,104 B2 | 4/2017 | Xin et al. | |
| 9,865,069 B1 | 1/2018 | Saporta et al. | |
| 9,986,154 B2 | 5/2018 | Chen et al. | |
| 9,998,663 B1* | 6/2018 | Frangois | H04N 5/23267 |
| 10,078,892 B1 | 9/2018 | Wang et al. | |
| 10,140,553 B1 | 11/2018 | Vasisht et al. | |
| 10,319,094 B1* | 6/2019 | Chen | G06N 3/08 |
| 10,332,295 B1 | 6/2019 | Saporta et al. | |
| 10,672,106 B1 | 6/2020 | Saporta et al. | |
| 10,672,169 B2 | 6/2020 | Saporta et al. | |
| 10,719,939 B2 | 7/2020 | Holzer et al. | |
| 10,853,985 B2 | 12/2020 | Saporta et al. | |
| 2002/0018076 A1 | 2/2002 | Gianola | |
| 2002/0063714 A1 | 5/2002 | Haas et al. | |
| 2002/0085219 A1 | 7/2002 | Ramamoorthy | |
| 2003/0030636 A1 | 2/2003 | Yamaoka | |
| 2003/0103065 A1 | 6/2003 | Masera et al. | |
| 2009/0112687 A1 | 4/2009 | Blair et al. | |
| 2012/0041722 A1 | 2/2012 | Quan et al. | |
| 2012/0293632 A1 | 11/2012 | Yukich | |
| 2013/0007579 A1* | 1/2013 | Dancy | G06Q 50/01 715/205 |
| 2013/0016181 A1 | 1/2013 | Penner | |
| 2013/0243351 A1 | 9/2013 | Feng et al. | |
| 2014/0010412 A1 | 1/2014 | Price | |
| 2014/0035947 A1 | 2/2014 | Kramer et al. | |
| 2014/0132594 A1 | 5/2014 | Gharpure et al. | |
| 2014/0152806 A1 | 6/2014 | Hauk | |
| 2015/0154708 A1 | 6/2015 | Simpson et al. | |
| 2015/0302633 A1 | 10/2015 | Li et al. | |
| 2015/0325038 A1 | 11/2015 | Baker | |
| 2015/0325048 A1 | 11/2015 | Engle et al. | |
| 2017/0006219 A1* | 1/2017 | Adsumilli | H04N 5/247 |
| 2017/0019627 A1* | 1/2017 | Wan | H04N 7/152 |
| 2018/0012330 A1 | 1/2018 | Holzer et al. | |
| 2018/0260793 A1 | 9/2018 | Li | |
| 2018/0293664 A1 | 10/2018 | Zhang et al. | |
| 2019/0335156 A1* | 10/2019 | Rusu | G06K 9/6289 |
| 2020/0126404 A1* | 4/2020 | Edwards | G08G 1/096791 |
| 2020/0349757 A1* | 11/2020 | Holzer | G06T 17/20 |
| 2020/0402178 A1* | 12/2020 | Brandmaier | H04N 5/232933 |
| 2021/0174469 A1* | 6/2021 | Liu | G06T 7/33 |
| 2021/0342997 A1* | 11/2021 | Malreddy | G06T 7/50 |

OTHER PUBLICATIONS

Asuka Yagi, Masataka Imura, Yoshiro Kuroda, and Osamu Oshiro; "360-Degree Fog Projection Interactive Display"; SIGGRAPH Asia 2011; Dec. 12-15, 2011; Hong Kong, China; ISBN 978-1-4503-0807-6/11/0012.

Matthew Mcginity, Jeffrey Shaw, Volker Kuchelmeister, Ardrian Hardjono, and Dennis Del Favero; "AVIE: A Versatile Multi-User Stereo 360° Interactive VR Theatre"; EDT 2007; Aug. 4, 2007; San Diego, California; ISBN 978-1-59593-669-1/07/0008.

Tina T. Zhou, Tom Gedeon, and Jess S. Jin, "Automatic Generating Detail-on-Demand Hypervideo Using MPEG-7 and SMIL"; MM'05; Nov. 6-11, 2005; Singapore: ISBN 1-59593-044-2/05/0011.

Petre Stroica and Marian Vladescu; "Implementation of an omni-directional surveillance system based on 360-degree panoramic vision": Advanced Topics in Optoelectronics, Microelectronics, and Nanotechnologies VI; Proc. of SPIE vol. 8411, 84111Y, [2012].

https://www.webrotate360.com/products/webrotate-360-product-viewer/version-history.aspx. Published prior to Nov. 2020.

https://www.dopeless-design.de/dapeless-rotate-jquery-plugin-360-degrees-product-viewer.html. Published prior to Nov. 2020.

https://github.com/pisi/Reel/btob/master/README.markdown. Published prior to Nov. 2020.

https://www.magictoolbox.com/magic360/. Published prior to Nov. 2020.

https://sirv.com/demos/demo-hotspot-on-360-spin/. Published prior to Nov. 2020.

https://www.ajax-zoom.com/. Published prior to Nov. 2020.

http:/www.ajax-zoom.com/exampies/example33.php. Published prior to Nov. 2020.

http://reel360.org/reel. Published prior to Nov. 2020.

https://www.ajax-zoom.com/index.php?cid=docs. Published prior to Nov. 2020.

https://www.webrotate360.com/examples/browse-all-examples/buoyancy-compensator.aspx. Published prior to Nov. 2020.

https://www.webrotate360.com/examples/browse-all-examples/360-car-photography.aspx. Published prior to Nov. 2020.

* cited by examiner

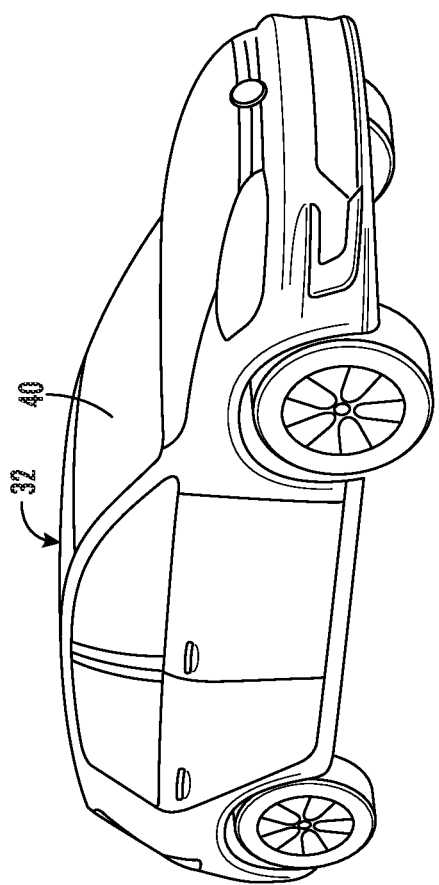
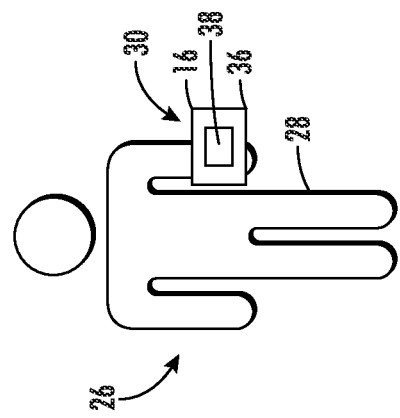
FIG. 2

BUMPER
- DOOR HANDLE
- ENGINE
- ENGINE HOOD
- EXHAUST
- FOG LIGHTS
- FRONT HEAD LIGHT
- GAS CAP
- GRILL
- LOGO
- NAVIGATION
- REAR LIGHTS
- REAR SEATS

SHIFTER
- SIDE MIRROR
- SIDE VIEW MIRROR
- STEERING WHEEL
- SUN/MOON ROOF
- TOWING HITCH
- TRUNK
- VENTS
- WHEEL —— 76
- WINDOWS
- WINDSHIELD
- OTHER —— 82

FIG. 6

| | | |
|---|---|---|
| 3_4TH_DRIVER_SIDE_FRONT | PASSENGER_SIDE | SHIFTER |
| 3_4TH_DRIVER_SIDE_REAR | REAR | PASSENGER_SIDE_DOOR_CONTROLS |
| 3_4TH_PASSENGER_SIDE_FRONT | REAR_ENTRY | TRUNK_RELEASE |
| 3_4TH_PASSENGER_SIDE_REAR | REAR_VIEW_MIRROR | REAR_SEATS |
| BACKUP_CAMERA | SPEAKER | VAN_INTERIORS |
| CENTER_CONSOLE | STEERING_WHEEL | REAR_ENTERTAINMENT |
| CONTROLS | STEERING_WHEEL_CONTROLS | TRANSFER_CASE |
| CUP_HOLDER | STEERING_WHEEL_SHIFTER_NIGHT | REAR_VENTS |
| DASHBOARD | SUN_MOON_ROOF | AUX_PORT |
| DISPLAY | TRUCK_BED_LINER | PANO_BACK |
| DOOR_HANDLE | TRUNK | PASSENGER_SEAT |
| DRIVER_ENTRY | TOW_HITCH | DRIVER_SEAT_CONTROLS |
| DRIVER_SIDE | VIN | PASSENGER_ENTRY |
| DRIVER_SIDE_DOOR_CONTROLS | WHEEL | ODOMETER |
| ENGINE | WINDOWS_STICKER ← 136 | DRIVER_SIDE_DOOR |
| FRONT | WINDSHIELD | ZOOMED_IN_NOSE_SHOT |
| FRONT_SEATS | WIPER_INDICATORS | INTERIOR_VIEW_FROM_REAR |
| INSTRUMENT_PANEL | POWER_OUTLET | REAR_SEATS_DIRECT |
| KEYFOB | USB_PORTS_POWER | REAR_SEATS_PASSENGER_SIDE |
| LOGO_SIGNS | USB_PORTS | REAR_SEATS_DRIVER_SIDE |
| NAVIGATION | GLOVE_BOX | |
| PASSENGER_SHIFTER_LEFT | PUSH_BUTTON_START | |

MACHINE LEARNING ARTIFICIAL INTELLIGENCE SYSTEM FOR PRODUCING 360 VIRTUAL REPRESENTATION OF AN OBJECT

TECHNICAL FIELD

The following disclosure relates generally to a machine-learning artificial intelligence system for producing 360 virtual photographic representation of the object and, more particularly, to a machine-learning artificial intelligence system and method for automatically producing 360 virtual photographic representations from images or video.

BACKGROUND

When selling products, such as vehicles, online, sellers often use rotatable, or 360 degree virtual photographic representation, often referred to as a "spin photograph" or simply a "spin." Sellers display the spin photographs on a screen for potential customers to manipulate. Potential buyers can manipulate the spin, rotating the spin in one direction or another to view the object in the photograph from various angles. Despite widespread use of such spins, the method for creating such spins has remained relatively unchanged. Spins can be captured in a photography studio using specialized equipment, such as professional lighting, a turntable, a tripod, etc. For some sellers, such as used vehicle dealers, it is often too expensive, time-consuming, or otherwise impractical to employ such professional capture techniques to collect spins form hundreds for vehicles.

Sellers can use their own cameras to take multiple photographs of an object then stitch the photographs together to create a spin. While this solution avoids the necessity for costly professional equipment, the manual processes of identifying the photographs, determining the object angle identified in each photograph, discarding superfluous photographs and "stitching" the photographs together to make a spin photograph is time-consuming and requires human expertise in the field of digital photographic manipulation.

Sellers can use various types of software on devices such as mobile phones, to capture photographs and create spins using a single device. While creating spins in this manner is quick and relatively inexpensive, the resulting spins are often not of a professional quality. One reason for this lower quality is that such software programs typically use all of the captured photographs, in sequential order, to create the spin. If the user accidentally takes photographs from angles that are too close or too far away from one another, the resulting spin can be choppy. An additional drawback associated with such systems is that they often do not allow for photographs to be added or subtracted from the sequence of photographs used to create the spin. Another drawback is that such systems often do not allow for manipulation of the individual photographs to remove background elements from the photographs or to adjust attributes like color balance from photograph to photograph. While programs do exist that allow a user to manipulate the collected photographs to add and subtract or otherwise manually manipulate the photographs, the process of manual editing is time-consuming and requires human expertise in the field of digital photographic editing.

It is also known in the art to augment photographs with image mapping to create "hotspots." Hotspots are areas of the photograph associated with a feature of the object that allows a user to click on to obtain additional information about that feature. The additional information can be any type of media, such as text, sound, video, etc. Although it is known to add hotspots to spins, the process involves multiple steps, each typically requiring additional human time and expertise for each step.

Prior art methods for producing high quality spins can require training to capture images and convert them to spins it in a consistent manner. Failure to consistently capture images may result in poor or inconsistent quality spins and may even require the images to be recaptured in a more consistent manner, all of which can be time-consuming and expensive.

The present invention improves upon prior art spin generation methods by employing a system and method that collects photographs of different angles of an object, automatically detects the angles shown in the photographs using machine learning & artificial intelligence, automatically inserts them into a spin, automatically identifies features using machine learning & artificial intelligence within if the photographs are associated with hotspots, and inserts hotspots into the spin at the locations associated with the hotspots.

SUMMARY OF THE DISCLOSED SUBJECT MATTER

The system and method of the present disclosure is directed to generating a spin of an object using multiple images or video of the object. The machine learning & artificial intelligence technology can differentiate between images or images extracted from a video of the object taken from different angles. In an illustrative implementation, several images, and/or one or more videos, of an object are taken from different angles. The method identifies the angles associated with the images and uses that identification to select and combine images in the proper order to create a spin of the object.

At least one aspect of the present disclosure is directed to using machine learning to identify the angles associated with the images and combine the images to create the spin. In some implementations, additional information can be added to the spin, such as interactive hotspots associated with features of the object shown in the images, while in other implementations machine learning is used to identify the features within the images and automatically associate the hotspots with the spin at locations associated with the features.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 2 is a perspective view of a user capturing object images and/or videos, in accordance with one or more aspects of the present disclosure.

FIG. 6 is a list of features to be identified by machine learning and artificial intelligence in captured images of an object, in accordance with one or more aspects of the present disclosure.

FIG. 9 is a list of classifications to be identified in captured images of an object by machine learning and artificial intelligence, in accordance with one or more aspects of the present disclosure.

DESCRIPTION OF EMBODIMENTS

Figure 1:
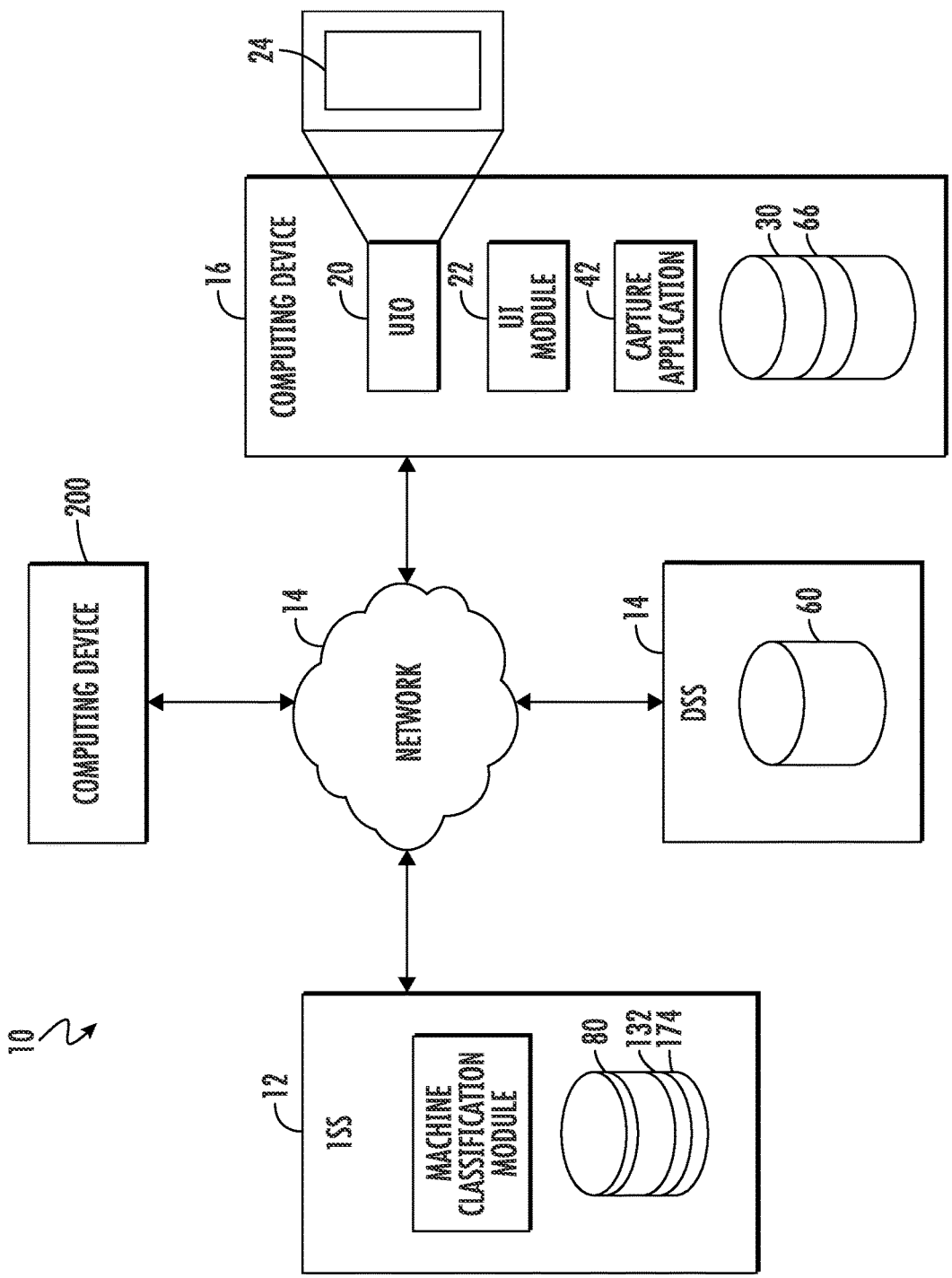
FIG. 1 is a conceptual diagram illustrating an example system for generating a spin from images and/or videos of an object, in accordance with one or more aspects of the present disclosure.

In general, techniques of this disclosure may enable a computing device to access multiple images of an object, displaying the image from multiple angles. A computing system associated with the computing device may analyze contextual information associated with the images and determine what angle the images show of the object. Based on the angle of the object shown in the images, the system may incorporate the images into a spin of the object.

For example, a user may walk around a vehicle, taking pictures and/or videos of the vehicle from various angles with the user's mobile device. The user may then upload the images and/or videos over the internet to a computer having software installed that examines the images or extracted images from the videos and places them in proper order and incorporates them into a spin of the image. The system is provided with classifications of the object associated with the different angles of the object. For example, if the object is a vehicle, the list of classifications may include a driver's side door, a bumper, and a passenger side door.

As known in the art, techniques of this disclosure use machine learning artificial intelligence to identify features of a vehicle from images of that vehicle. The artificial intelligence aspect of the system improves the identification accuracy and processing time by generating a classification function and an attribute identification function using specific training data sets. If desired, the attribute identification function may be a convolutional neural network (CNN). The classification function is determined based on a first group of images, categorized and labeled into at least two groups of images. The classification function also classifies and labels a second group of images which is used to generate the attribute identification function. The attribute identification function preferably identifies variables from images such as vehicle make, vehicle model, vehicle angles, vehicle features, vehicle year, and/or vehicle trim. By facilitating management of computing resources, this division of classification and attribute functions improves the identification system. The machine-learning artificial intelligence system may also improve the accuracy of detection by generating a training data set with a high relevance. To overcome lack of uniformity from images received for identification, the training data sets used by the identification system may include images that are modified to account for variations from images taken with mobile devices. The identification system may also be automatically updated as new images become available and vehicle information changes and a web scraper used to collect new images available from online resources. As information in online resources changes, the identification system may recalculate the classification and attribute identification functions to improve results.

A novel feature of the machine learning artificial intelligence component of the system examines the images against the list of classifications to find an image showing the driver's side door, another image showing the bumper, and another image showing the passenger side door. The system then automatically incorporates the three images into a spin, being sure to automatically position the image of the bumper between the images of the driver's side door and the passenger's side door when creating the spin. As the system examines images associated with the object, the machine learning component of the system may continuously update itself to better classify the images for incorporation into spins.

The system may also be provided with data associated with various features of the object. The machine learning artificial intelligence component of the system scans the images to identify and locate the features of the object in the images. As used in this context, machine learning artificial intelligence refers to computer-aided supervised learning that uses complex mathematical formalisms to make inference-based assumptions to improve the accuracy of the mapping of inputs to outputs using one or more general rules. The system automatically adds a hotspot to the spin at the location associated with the feature. The hotspot contains some or all of the data associated with the feature. When a user selects the hotspot in the spin, the system provides the user with the data, by presenting a text window, launching a video, playing audio, etc. As the system examines images associated with the object, the machine learning component of the system may continuously update itself to better locate features of the object in the images to add hotspots.

Lastly, the system may examine the images to differentiate the object in the images from the background. The machine learning component may continuously update itself to better separate the object in the images from the background. Once the object has been differentiated from the background in the images, the system can automatically separate the object from the background in the images to create the spin. The system may leave the background blank, may automatically insert a solid color background, or may insert a detailed background such as a rustic or urban landscape.

Throughout the disclosure, examples are described where a computing device and/or a computing system analyzes images associated with an object to automatically identify the object in the images, classify the images based on the location of the object in the images, and combine the images into a spin of the object. For example, a vehicle dealer wishing to create a spin of a vehicle may walk around the vehicle taking pictures and/or videos of the vehicle with a mobile device. The dealer then sends the images and/or videos to the system that may be a cloud application, an application on the dealer's mobile device, etc. The system then automatically analyzes the images or extracted images from the videos to identify the vehicle within the images and classify the vehicle within the images to create a spin of the vehicle. The system also automatically identifies vehicle features within the images, such as a heated driver's side mirror and associates them with hotspots in the spin that give more information about the features. The system may also separate the image from the background in the images using machine learning and artificial intelligence and replace the background with a city scene. Once the spin is completed, the user may manipulate the spin to view the vehicle from various angles and click on hotspots to learn more about various features of the vehicle.

Exemplary Systems

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first image could be termed a second image, and, similarly, a second image could be termed a first image, without departing from the scope of the present invention. The first image and the second image are both images, but they are not the same image.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as application and other smart phone functions. Exemplary embodiments of portable multifunction devices include, without limitation, the iPhone®, and iPad® devices from Apple Inc. of Cupertino, Calif. Other portable electronic devices, such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, stylus, a mouse and/or a joystick.

The device typically supports a variety of applications, such as one or more of the following: a telephone application, an e-mail application, an instant messaging application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of the system and method for automatically producing spin photographs. FIG. 1 is a conceptual diagram illustrating system 10 as an example system for automatically examining and classifying images and combining the images into a spin of the object, in accordance with one or more aspects of the present disclosure. System 10 includes information server system ("ISS") 12 in communication, via network 14, with dealer server system ("DSS") 14 and computing device 16. Although system 10 is shown as being distributed amongst ISS 12, DSS 14, and computing device 16, in other examples, the features and techniques attributed to system 10 may be performed internally, by local components of computing device 16.

Similarly, ISS 12 may include certain components and perform various techniques that are otherwise attributed in the below description to DSS 14 and computing device 16.

Network 18 represents any public or private communications network, for instance, cellular, Wi-Fi, and/or other types of networks, for transmitting data between computing systems, servers, and computing devices. ISS 12 may communicate, via network 18, with computing device 16 to receive images from the computing device 16. Similarly, ISS 12 may communicate, via network 18, with DSS 14 to receive data associated with objects (such as vehicles) depicted in images received from computing device 16.

Network 18 may include one or more network hubs, network switches, network routers, or any other network equipment, that are operatively inter-coupled thereby providing for the exchange of information between ISS 12, DSS 14, and computing device 16. Computing device 16, ISS 12, and DSS 14 may transmit and receive data across network 18 using any suitable communication techniques. ISS 12, DSS 14, and computing device 16 may each be operatively coupled to network 18 using respective network links. The links coupling computing device 16, ISS 12, and DSS 14 to network 18 may be Ethernet or other types of network connections and such connections may be wireless and/or wired connections.

Computing device 16 represents an individual mobile or non-mobile computing device. Examples of computing device 16 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant), a personal digital assistants (PDA), portable gaming systems, media players, e-book readers, mobile television platforms, automobile navigation and entertainment systems, or any other types of mobile, non-mobile, wearable, and non-wearable computing devices configured to receive information via a network, such as network 18. Computing device 16 includes user interface device (UID) 20 and user interface (UI) module 22. Module 22 may perform operations described using software, hardware, firmware, or a mixture of hardware, software, and firmware residing in and/or executing at respective computing device 16. Computing device 16 may execute module 22 with multiple processors or multiple devices. Computing device 16 may execute module 22 as virtual machines executing on underlying hardware. Module 22 may execute as one or more services of an operating system or computing platform. Module 22 may execute as one or more executable programs at an application layer of a computing platform.

UID 20 of computing device 16 may function as an input and/or output device for computing device 16. UID 20 may be implemented using various technologies. For instance, UID 20 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 20 may include microphone technologies, infrared sensor technologies, or other input device technology for use in receiving user input.

UID 20 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 16. In addition, UID 20 may include speaker technologies, haptic feedback technologies, or other output device technology for use in outputting information to a user.

UID 20 may include a presence-sensitive display that may receive tactile input from a user of computing device 16. UID 20 may receive indications of tactile input by detecting one or more gestures from a user (e.g., the user touching or pointing to one or more locations of UID 20 with a finger or a stylus pen). UID 20 may present output to a user, for instance at a presence-sensitive display. UID 20 may present the output as a graphical user interface (e.g., user interface 24), which may be associated with functionality provided by computing device 16 and/or a service being accessed by computing device 16.

For example, UID 20 may present a user interface (e.g., user interface 24) related to uploading images to ISS 12 which UI module 22 accesses from ISS 12 on behalf of computing device 16. In some examples, UID 20 may present a user interface related to image collection and distribution functions provided by UI module 22 or other features of computing platforms, operating systems, applications, and/or services executing at or accessible from computing device 16 (e.g., electronic message applications, Internet browser applications, mobile or desktop operating systems, etc.).

UI module 22 may manage user interactions with UID 20 and other components of computing device 16 including interacting with ISS 12 so as to provide spin generation results at UID 20. UI module 22 may cause UID 20 to output a user interface, such as user interface 24 (or other example user interfaces) for display, as a user of computing device 16 views output and/or provides input at UID 20. UI module 22 and UID 20 may interpret inputs detected at UID 20 and may relay information about the inputs detected at UID 20 to one or more associated platforms, operating systems, applications, and/or services executing at computing device 16, for example, to cause computing device 16 to perform functions.

UI module 22 may receive information and instructions from one or more associated platforms, operating systems, applications, and/or services executing at computing device 16 and/or one or more remote computing systems, such as ISS 12 and DSS 14. In addition, UI module 22 may act as an intermediary between the one or more associated platforms, operating systems, applications, and/or services executing at computing device 16, and various output devices of computing device 16 (e.g., speakers, LED indicators, audio or electrostatic haptic output device, etc.) to produce output (e.g., a graphic, a flash of light, a sound, a haptic response, etc.) with computing device 16.

In the example of FIG. 1, user interface 24 is a graphical user interface associated with a customer assistance service provided by ISS 12 and accessed by computing device 16. As shown in FIG. 1, user interface 24 presents "image capture" from ISS 12 to aid a user in capturing images to convert into a spin. User interface 24 may present product information in various forms such as text, graphics, content cards, images, etc. UI module 22 may cause UID 20 to output user interface 24 based on data UI module 22 receives via network 18 from ISS 12. UI module 22 may receive graphical information (e.g., text data, images data, etc.) for presenting user interface 24 as input from ISS 12 along with instructions from ISS 12 for presenting the graphical information within user interface 24 at UID 20.

Figure 3:
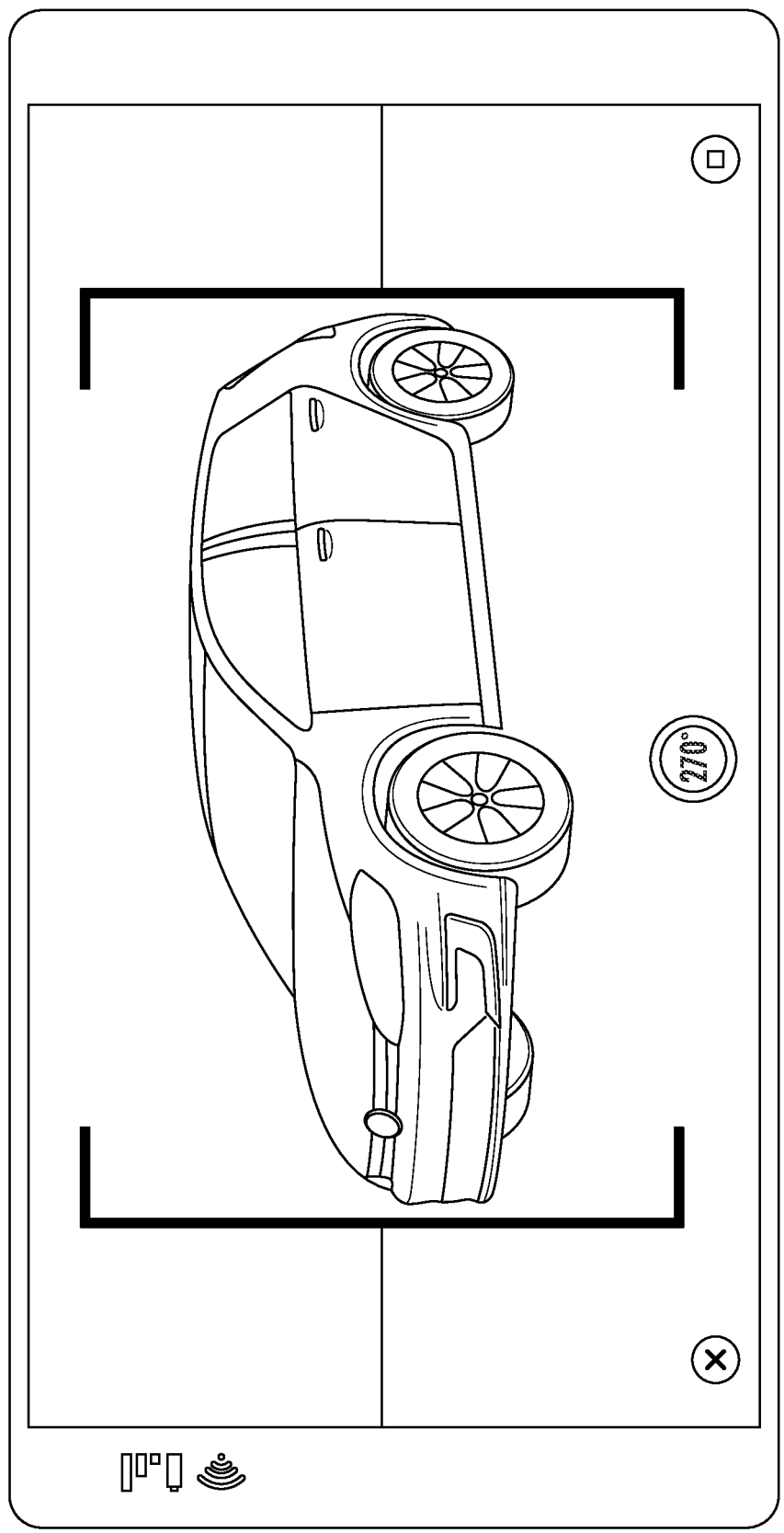
FIG. 3 is a conceptual diagram illustrating an example graphical user interface presented by an example computing device that is configured to capture object images and/or videos at a physical location, in accordance with one or more aspects of the present disclosure.

FIG. 2 is a perspective view of a user 26, in this embodiment a vehicle dealer 28, using computing device 16 to capture images 30 by taking multiple pictures of an object 32. In this embodiment, computing device 16 is a mobile phone 34 having a camera 36 and display 38, and the object 32 is a vehicle 40. When dealer 28 wishes to use system 10 to create a spin of vehicle 40, dealer 28 launches a downloaded application 42 running locally on computing device 16. FIGS. 1-3. As shown in FIG. 3, when dealer 28 launches application 42, display 38 of computing device 16 displays an image capture screen 44. As shown in FIG. 3, when dealer 28 focuses computing device 16 to capture an image 30, system 12 presents on display 38 associated with computing device 16, the user interface 24.

User interface 24 provides multiple aids to assist dealer 28 in optimizing image capture to facilitate system 10 combining images 30 into a spin. Two such aids are target brackets 46 and level lines 48 and that indicate to dealer 22 where to position vehicle 40 on display 38 to facilitate system 16 being able to analyze, classify, and incorporate images 30 into a spin. When dealer 22 aims computing device 16 at vehicle 34, user interface 24 associated with system 10 displays target brackets 46 and level lines 48. Dealer 28 adjusts camera 36 of computing device 16 until object 32 appears on display 38 between the target brackets 46. Dealer 28 then adjusts camera 36 until level lines 48 are generally collinear with a centerline 50 defined by vehicle 40 and captures a first image 52 of vehicle 40 showing at least an identifiable portion of vehicle 40. FIGS. 1, 3, and 7A-B. To capture a second image 56, dealer 28 moves to a different location, points camera 36 toward vehicle 40 and captures a second image 54 in a manner such as that described above. Dealer 28 repeats this process, moving around vehicle 40 capturing images 30 from different angles until dealer 28 has completely circled vehicle 40. Alternatively, especially when it is desired to capture images of smaller objects, instead of circling vehicle 40, dealer 28 may, instead, choose to place vehicle 40 or other object 32 on a rotating base (not shown). If a rotating base is used, dealer 28 may remain in place and capture images 30 of vehicle 40 until vehicle 40 has made a complete revolution. Preferably, whatever method is used, dealer 28 captures images 30 completely around vehicle 40.

Figure 4:
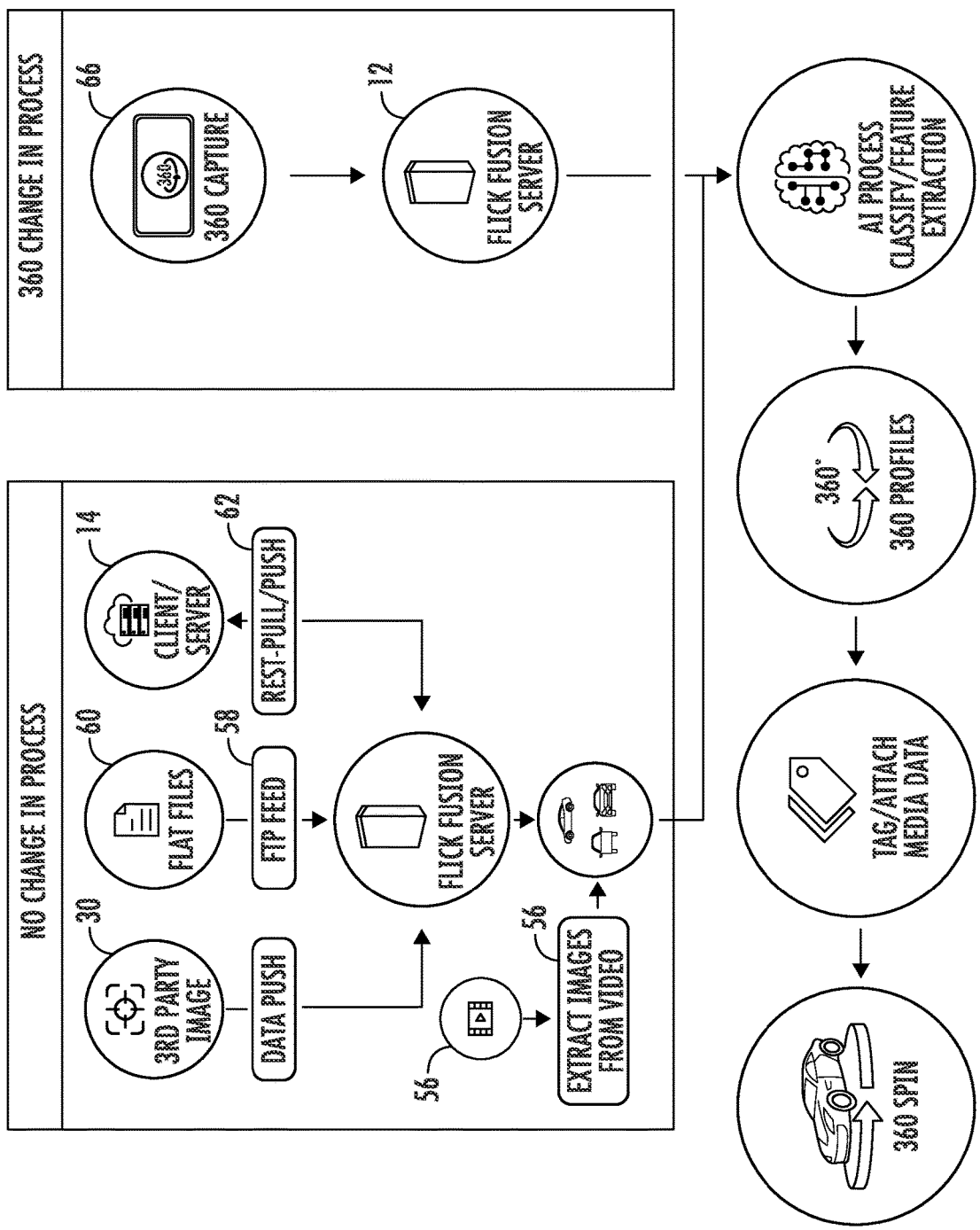
FIG. 4 is a flowchart illustrating example operations performed by an example computing system that is configured to convert captured images or and/videos into a spin photograph, in accordance with one or more aspects of the present disclosure.

As shown in FIG. 4, once images 30 of object 32 have been captured, system 10 automatically transfers data from computing device 16 to ISS 12. This data comprises at least one image from the plurality of images 30. Preferably the system 10 automatically transfers supplemental data from computing device 16 to ISS 12 containing all of the remaining desired images 30. Alternatively, as shown in FIG. 4, dealer 28 may manually upload images 30 from computing device 16 to ISS 12. As another alternative, dealer 28 may upload images 30 from computing device 16 to DSS 14, which, in turn, uploads images 30 to ISS 12.

Instead of captured still images, images 30 may instead be still images automatically extracted 56 by system 10 from standard video files 57. ISS 12 may also receive data relating to images 30 via FTP feed 58 from a flat files database 60 or from DSS 14, using representational state transfer (REST) pull/push 62 or similar architecture. This additional data may relate to vehicle 40 shown in images 30, such as make, model, year, damage, or special features. In alternative embodiment, user 26 can capture 64 a 360-degree image 66 and upload it to ISS 12.

Figure 5A:
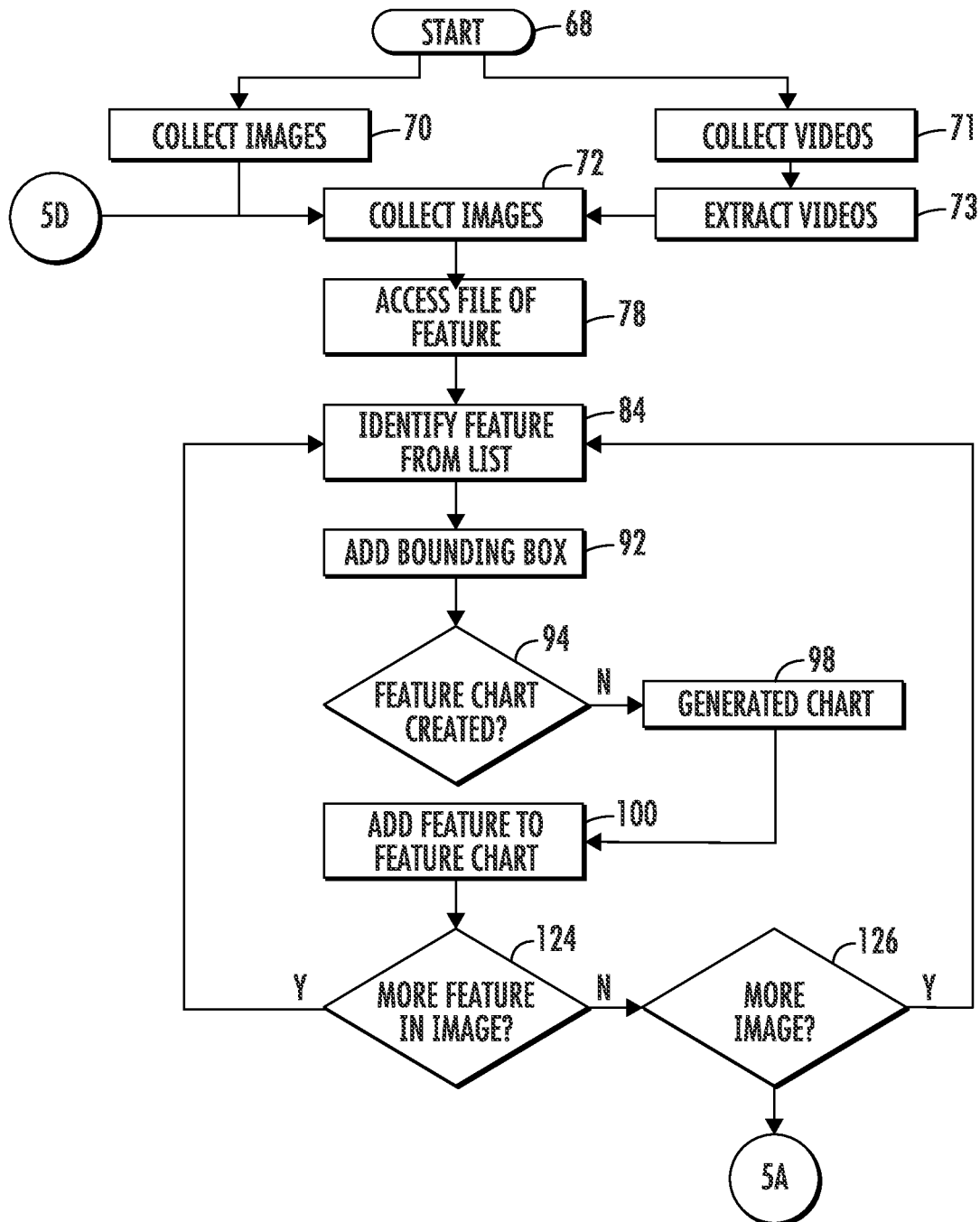
FIGS. 5A-5C is a flowchart illustrating example operations performed by an example computing device that is configured to convert captured images or and/videos into a spin photograph, in accordance with one or more aspects of the present disclosure, in accordance with one or more aspects of the present disclosure.
Figure 5B:
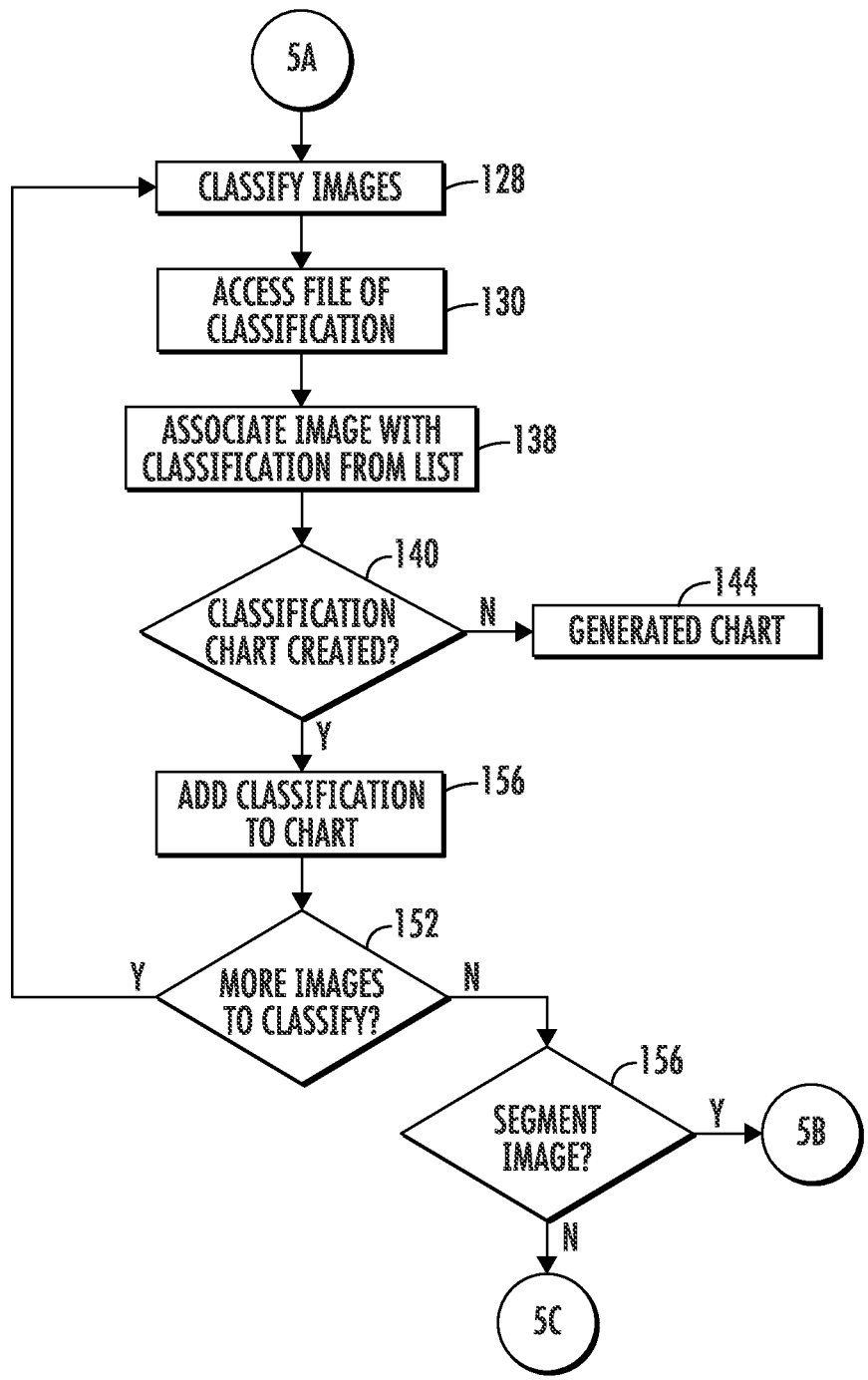
Figure 5C:
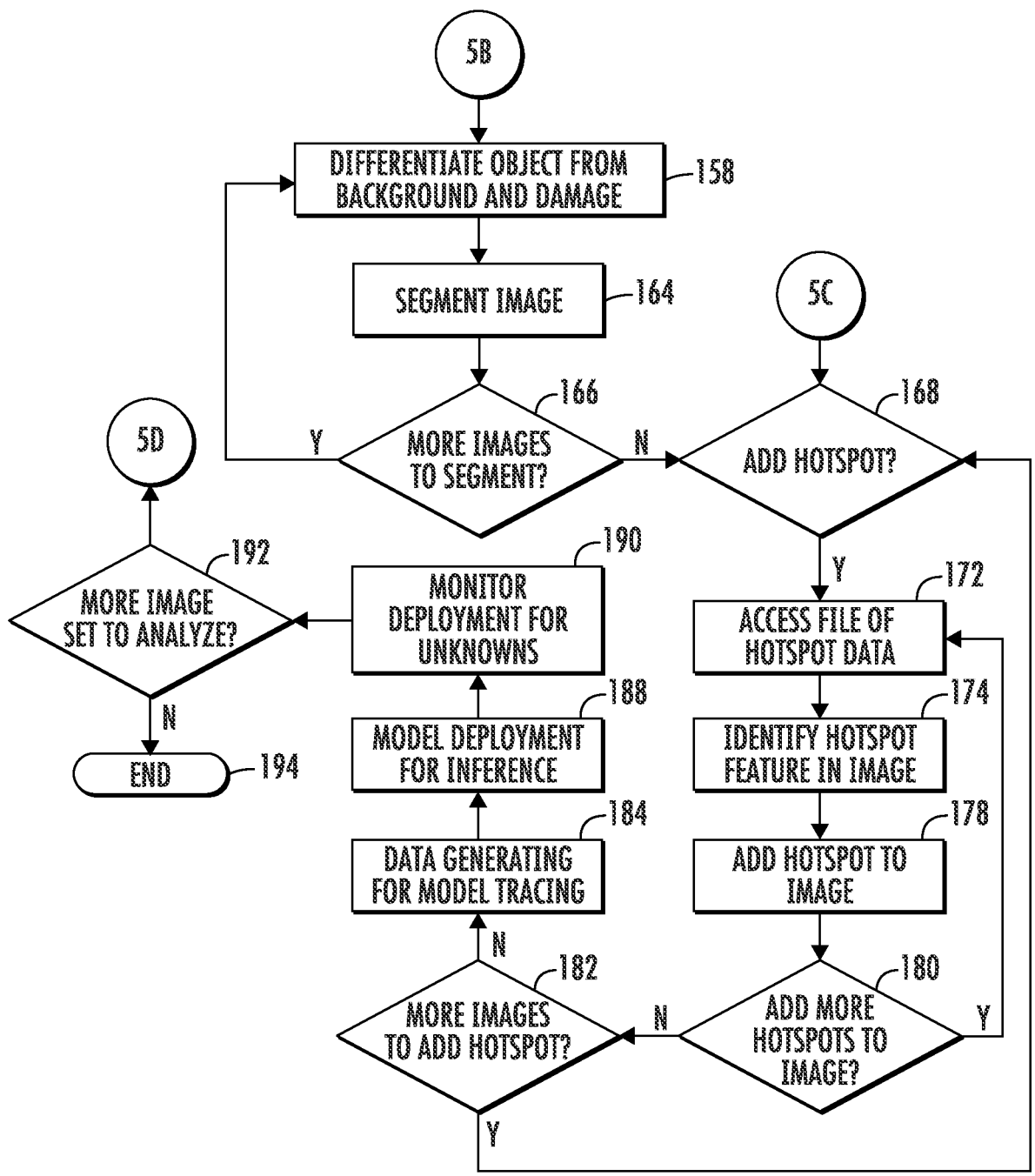

As shown in FIG. 5, the process for creating a spin using system 10 is preferably completely automated, starting 68 with dealer 28 collecting 70 images 30, ISS 12 receiving 72 those images 30. Upon receipt of images 30, system 10 uses machine classification module 74 to identify features 76 in images 30. Machine classification module 74 accesses 78 ISS 12 to retrieve a file 80 containing a predetermined list 82 of features 76 of vehicles 40 to be identified in images 30. In addition to list 82, ISS 12 may store numerous files 80 containing different predetermined lists 82 of features 76 to be identified in images 30 of various vehicles 40 and other objects 32 as desired.

Machine classification module 74 uses contextual image classification and machine learning to identify patterns in first image 52 based on contextual information in image 52, such as the groupings of pixels surrounding a target pixel. Machine classification module 74 compares contextual information derived from first image 52 against features 76 in list 82 to identify 84 targets 86 and surrounds targets 86 with bounding boxes 88 in a manner such as those known in the art. For example, as shown in FIGS. 1, 6, and 7A-B, machine classification module 74 receives 72 images 30 from dealer 28, accesses 78 list 82 of features 76 from ISS 12, identifies 84 a target 86 in first image 52 as a feature 76 of vehicle 40 on list 80, such as a door handle 90, and adds 92 a bounding box 88 around the target 86. Once a feature 76 has been identified in first image 52, machine classification module 74 determines 94 whether a feature chart 96 has been generated and, if not, generates 98 a feature chart 96 such as that shown in FIG. 8.

Figure 7A:
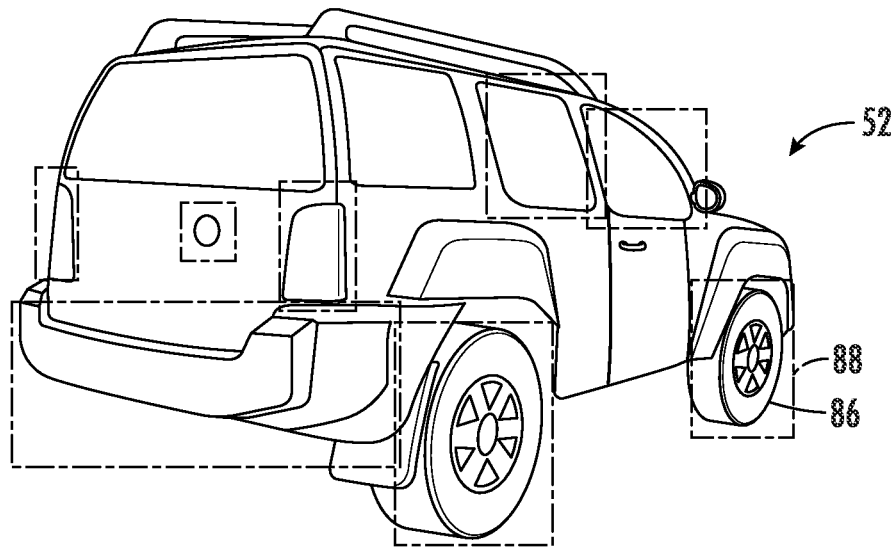
FIG. 7A is a captured image of a three-quarter rear passenger side view of a vehicle and provided with boundary boxes identified by machine learning and artificial intelligence, in accordance with one or more aspects of the present disclosure.
Figure 8:
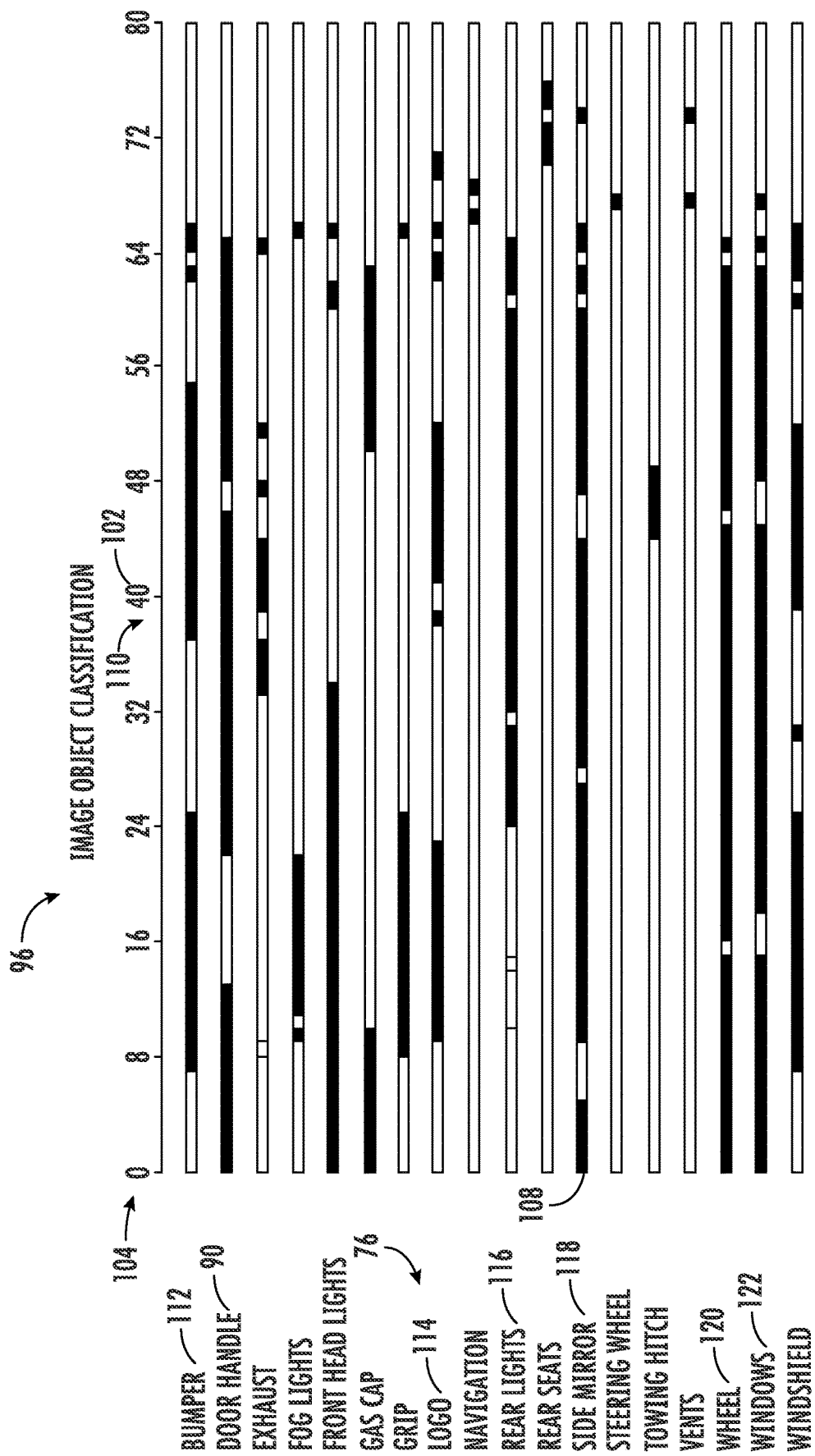
FIG. 8 is a feature chart identifying features identified in captured images by machine learning and artificial intelligence, in accordance with one or more aspects of the present disclosure.

Feature chart 96 lists features 76 machine classification module 74 finds in images 30, listing features 76 along a y-axis 100 and image numbers 102 along an x-axis 104. Once feature chart 96 has been generated 98, as machine classification module 74 identifies 84 features in first image 52, the module 74 adds 106 those features 76 to feature chart 96 by darkening all lines 108 in feature chart 96 corresponding to the identified feature along y-axis 100 and a unique number 110 associated with images 30 along x-axis 104. While unique number 110 is preferably a number identifying the sequential order in which the associated image 30 was captured, unique number may instead be randomly selected or otherwise assigned as desired. For example, as shown in FIGS. 7A and 8, if first image 52 is associated with unique number 39, machine classification module 74 would identify features including door handle 90, bumper 112, logo 114, rear lights 116, side mirror 118, wheel 120, and windows 122 and darkens all portions of lines 108 in feature chart 96 corresponding to those features 76 under image number 39.

After adding an identified feature to feature chart 96, machine classification module 74 determines 124 if there are any more unidentified features 76 in first image 52 and, if so, returns to step 84. The system 10 continues until machine classification module 74 determines 124 there are no more unidentified features 76 in first image 52, at which point, module 74 determines 126 if there are any more images 30 that have not been analyzed and added to feature chart 96. For example, if machine classification module 74 determines 124 there are no more unidentified features 76 in first image 52, module 74 returns to step 84 and analyzes second image 54. The system 10 continues in this manner until machine classification module 74 has identified and added all desired features 76 in all images 30 to feature chart 96, at which point the module 74 classifies 128 images 30.

To classify 128 images 30, machine classification module 74 accesses 130 ISS 12 to retrieve a file 132 containing a predetermined list 134 of classifications 136 of images 30. As shown in FIG. 9, classifications 134 may include descriptions of the image 30, such as what portion of the object is shown in the image 30 and from what angle. In addition to list 134, ISS 12 may store numerous files 132 containing different predetermined lists 134 of classifications 136 to associate with images 30 of various vehicles 40 and other objects 32 as desired.

In an exemplary embodiment, machine classification module 74 uses previously identified features 76 in images 30, contextual information, and machine learning to identify patterns in first image 52 to associate 138 first image 52 with a classification 136 selected from the list 134 of classifications 136. For example, machine classification module 74 may determine, based on previously identified features 76 in first image 52 that the classification 136 from list 134 most closely matching first image 52 is 3_4th_passenger_side_rear, indicating that first image 52 shows a three-quarters image of vehicle 40 taken from the rear passenger side of vehicle 40. Alternatively, machine classification module 74 may use contextual image classification and machine learning to identify patterns in first image 52 based on contextual information in image 52, such as the groupings of pixels surrounding a target pixel in a manner such as that described above in relation to identifying 82 targets 84, albeit using target to classify images rather than simply identify features within images.

Figure 10:
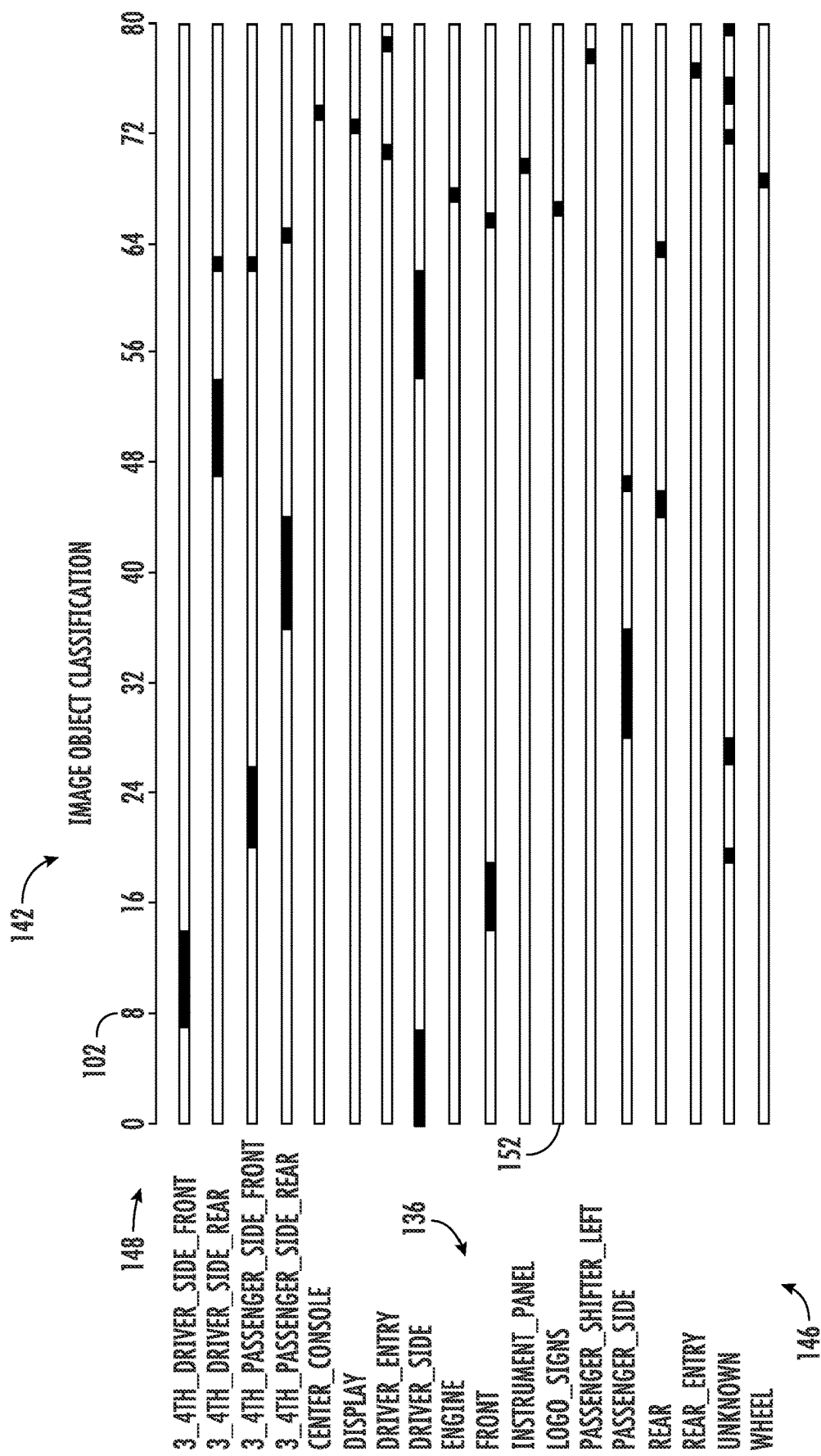
FIG. 10 is a classification chart identifying classifications identified in captured images by machine learning and artificial intelligence, in accordance with one or more aspects of the present disclosure.

Once first image 52 has been associated 138 with a classification 136, machine classification module 74 determines 140 whether a classification chart 142 has been generated and, if not, generates 144 a classification chart 142 such as that shown in FIG. 10. Classification chart 142 lists classifications 136 that machine classification module 74 has associated with various images 30, listing classifications 136 along a y-axis 146 and image numbers 102 along an x-axis 148. Once classification chart 142 has been generated 144, as machine classification module 74 classifies first image 52, the module 74 adds 150 the classification 136 associated with first image 52 to classification chart 142 by darkening all lines 152 in classification chart 142 corresponding to the associated classifications 136 along y-axis 146 and unique numbers 110 associated with images 30 along x-axis 148.

Figure 7B:
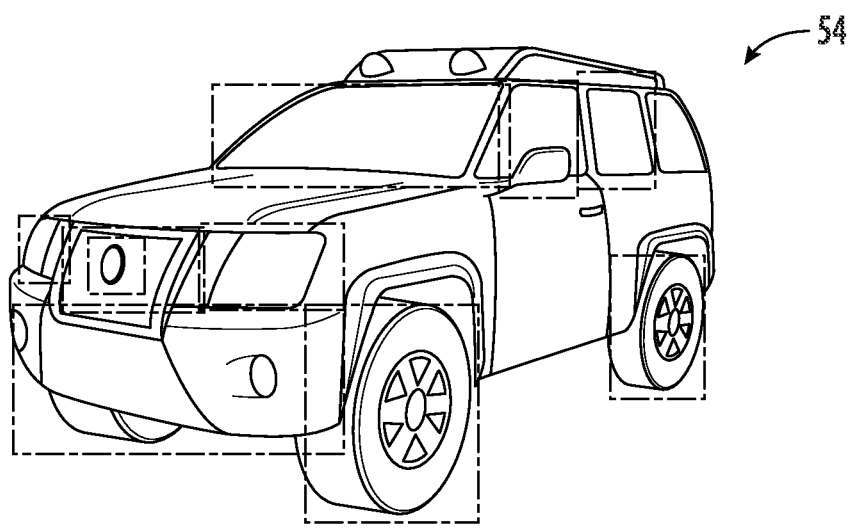
FIG. 7B is a captured image of a three-quarter front driver side view of a vehicle and provided with boundary boxes identified by machine learning and artificial intelligence, in accordance with one or more aspects of the present disclosure.

For example, as shown in FIGS. 7A-B and 10, if first image 52 is associated with the classification 3_4th_passenger_side_rear, machine classification module 74 would darken a portion of line 152 in classification chart 142 corresponding to classification 3_4th_passenger_side_rear under image number 39. After adding 150 an identified classification to classification chart 142, machine classification module 74 determines 154 if there are any more images 30 that have not been classified and added to classification chart 142. For example, if machine classification module 74 determines 154 there are additional images 30 to classify, system 10 returns to step 128 to classify the next image 30.

The system 10 continues in this manner until machine classification module 74 has classified all desired images 30 and added all desired classifications 136 to classification chart 142, at which point the module 74 determines 156 if images 30 are to be separated from backgrounds 158 associated with images 30. FIGS. 1, 5A-D, 10, and 11A-D. If module 74 determines 156 images 30 are to be separated from backgrounds 158, module 74 begins to separate vehicles 40 within images 30 from their associated backgrounds 158.

Figure 11A:
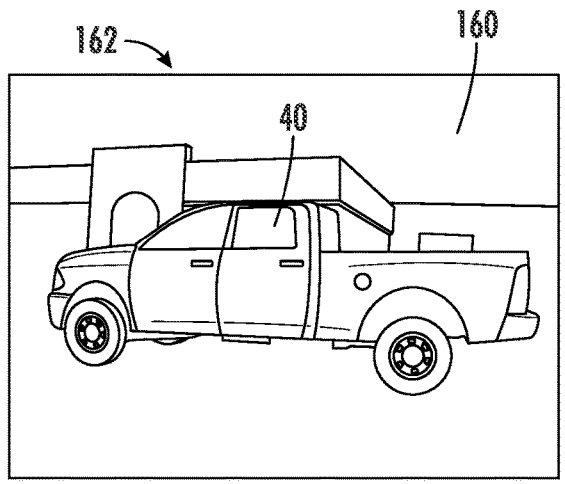
FIG. 11A is a captured and unaltered image of a vehicle, in accordance with one or more aspects of the present disclosure.
Figure 11B:
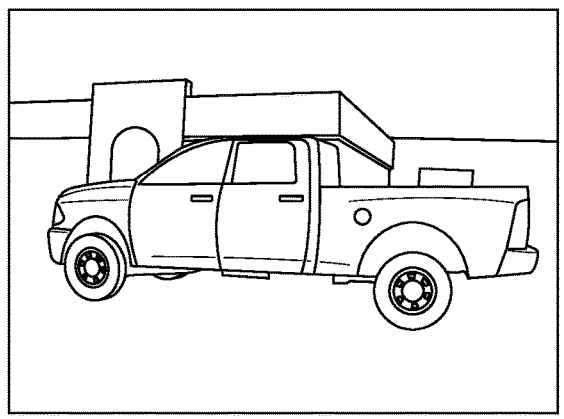
FIG. 11B is the captured image of FIG. 11A, shown with the object highlighted against the background, in accordance with one or more aspects of the present disclosure.
Figure 11C:
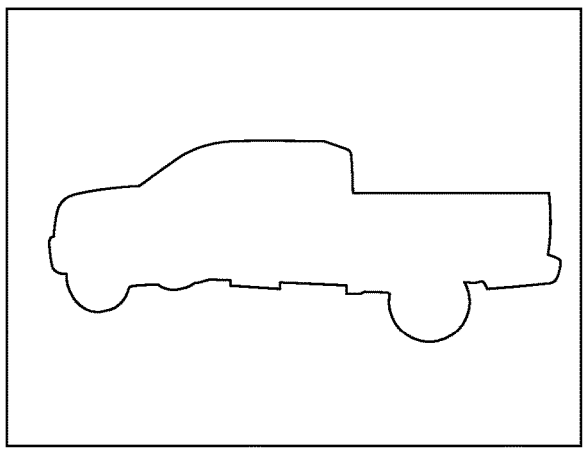
FIG. 11C is the captured image of FIG. 11A, shown with the background blacked out by machine learning and artificial intelligence, in accordance with one or more aspects of the present disclosure.
Figure 11D:
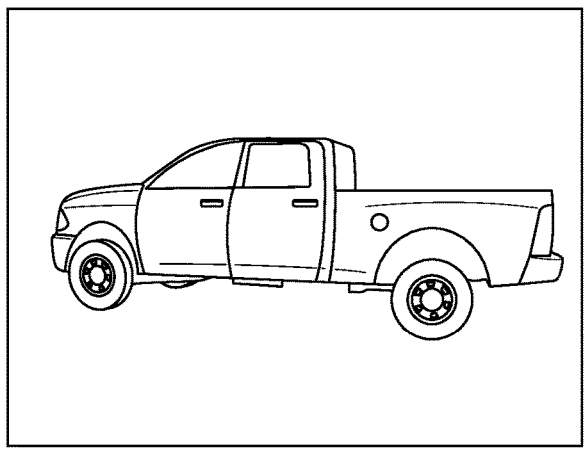
FIG. 11D is the captured image of FIG. 11A, shown with the background replaced with a green background by machine learning and artificial intelligence, in accordance with one or more aspects of the present disclosure.

The background separation process begins with machine classification module 74 using contextual image classification and machine learning to identify patterns in images 30 based on contextual information in images 30, such as the groupings of pixels surrounding a target pixel to differentiate 158 vehicle 40 within each image 30 from background 160 within each image 30. For example, as shown in FIGS. 1, and 11A-D, machine classification module 74 receives 72 images 30 from dealer 28, and in a selected image 162 differentiates 158 the vehicle 40 from background 160 in image 162. Once vehicle 40 and background 160 have been separated, as shown in FIGS. 11C-D, machine classification module 74 segments 164 image 162 by identifying all background 160 in image 162 that is not vehicle 40, and removing background 160 from image 162, leaving only vehicle 40. Segmentation can be further used to identify any blemishes or damage on the vehicle, to which the system can automatically associate with tags and/or hotspots. Preferably, the system 10 automatically identifies one or more locations in the image 162 and automatically associates that location with a visibly perceptible damage indicator in the final to the spin photograph 186. If desired, system 10 may add a new background 160 to image 162, such as a rural or urban setting, a solid color, or any other desired effect known in the art.

After segmenting image 162, machine classification module 74 determines 166 if there are any more images 30 that have not been segmented. For example, if machine classification module 74 determines 166 there are additional images 30 to segment, system 10 returns to step 158 to classify the next image 30. The system 10 continues in this manner until machine classification module 74 has segmented all images 30 that need to be segmented, at which point the module 74 determines 168 if it is desired to add any hotspots 170 to images 30. Similarly, if machine classification module 74 has determined 168 that no images 30 are to be segmented, the module 74 also determines 168 if it is desired to add any hotspots 170 to images 30.

Figure 12:
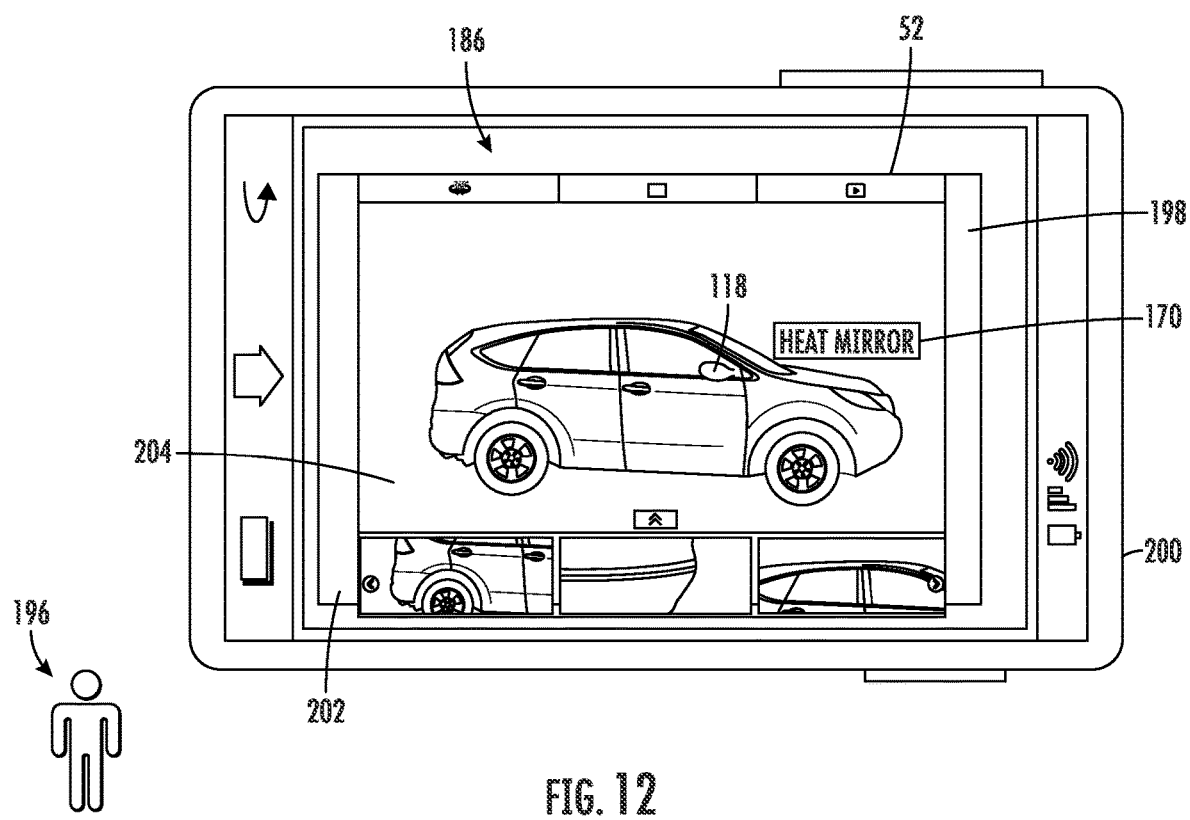
FIG. 12 is a display of an end user computing device displaying an exterior 360 virtual photographic representation ("spin"), in accordance with one or more aspects of the present disclosure.

To add hotspots 170 to images 30, machine classification module 74 accesses 172 ISS 12 to retrieve a file 174 containing a predetermined list of media, as well as a list of those features in images 30 to be associated with the media via a hotspot 170. FIGS. 1 and 12. The media may be audio, video, text, or any other media known in the art.

In an exemplary embodiment, machine classification module 74 uses previously identified features 76 in images 30, contextual information, and machine learning to identify 174 features 76 from file 176 to be associated with hotspots 170. FIGS. 1, 6, 8, and 12. For example, machine classification module 74 may determine, based on file 174 and previously identified features 76 in first image 52 that a hotspot 170 needs to be added to the side mirror 118 to indicate that the side mirror 118 is heated and to indicate the method of operating the heating function. Machine classification module 74 uses previously identified feature of side mirror 118 and adds 178 a hotspot 170 to first image 52 that when hovered over with a cursor reveals text indicating that side mirror 118 is heated and when clicked launches a video explaining the method of operation of the heating function. Alternatively, machine classification module 74 may use contextual image classification and machine learning to identify patterns in first image 52 based on contextual information in image 52, such as the groupings of pixels surrounding a target pixel in a manner such as that described above in relation to identifying 82 targets 84, albeit using target to identify features 76 to associate with added hotspots 170.

After machine classification module 74 adds 178 a hotspot 170 to first image 52, the module 74 uses file 176 to determine 180 if there are any more hotspots 170 to add to the first image 52, in which case the system returns to step 172 to add an additional hotspot 170. If machine classification module 74 determines 180 there are no more hotspots 170 to add to the first image 52, the module 74 determines 182 if there are any more images 30 that need added hotspots 170 and, if so, returns to step 168 to examine the next image 30 needed hotspot annotation. The system 10 continues in this manner until machine classification module 74 has added all hotspots 170 from file 176 to images 30, at which point the module 74 uses information collected in classification chart 142 to automatically generate 184 a spin photograph 186. Preferably, machine classification module 74 automatically generates 184 spin photograph 186 by ordering images 30 used in spin according to classifications determined above. For example, if machine classification module 74 classifies first image 52 as 3_4th_passenger_side_rear, second image 54 as 3_4th_driver_side_front, another image 30 as rear, and yet another image 30 as front, machine classification module 74 will automatically position the front image 30 and the rear image 30 between the first image 52 and the second image 54 when generating 184 the spin photograph 186.

Once machine classification module 74 has generated 184 spin photograph 186 machine classification module 74 uses spin photograph 186 for model training, using machine-learning to improve spin photograph 186, adding or removing images as necessary, or even using two sequential images 30 to generate a new transitional image that is parts of both images to be inserted into spin photograph 186 between the two images to smooth the transition between images in spin photograph 186. Once machine classification module 74 finalizes model training, the module 74 deploys 188 spin photograph 186 for inference. Upon inference completion, module 74 uses machine learning to monitor 190 deployment 188 for unknowns.

Finally, after machine classification module 74 has deployed and monitored spin photograph 186, machine classification module 74 determines 192 if there are more sets of images 30 to use to generate spin photographs 186, in which case system 10 returns to step 72. If machine classification module 74 determines 192 if there are more sets of images 30 to use to generate spin photographs 186, the process terminates 194.

After machine classification module 74 has deployed and monitored spin photographs 186, end users 196 may display the spin photographs on displays 198 of their own computing devices 200, and manipulate spin photographs 186 with a touchscreen 202, touchpad, mouse, or any device known in the art. End users may also select hotspots 170 to obtain additional information regarding various features associated with vehicles 40 displayed in spin photographs 186.

After machine classification module 74 has deployed and monitored spin photographs 186, end users 196 may display the spin photographs on displays 198 of their own computing devices 200, and manipulate spin photographs 186 with a touchscreen 202, touchpad, mouse, or any device known in the art from a first perspective of vehicle 40 associated with the first image 52 to a second perspective of vehicle 40 associated with second image 54. End users may also select hotspots 170 to obtain additional information regarding various features associated with vehicles 40 displayed in spin photographs 186.

Figure 13:
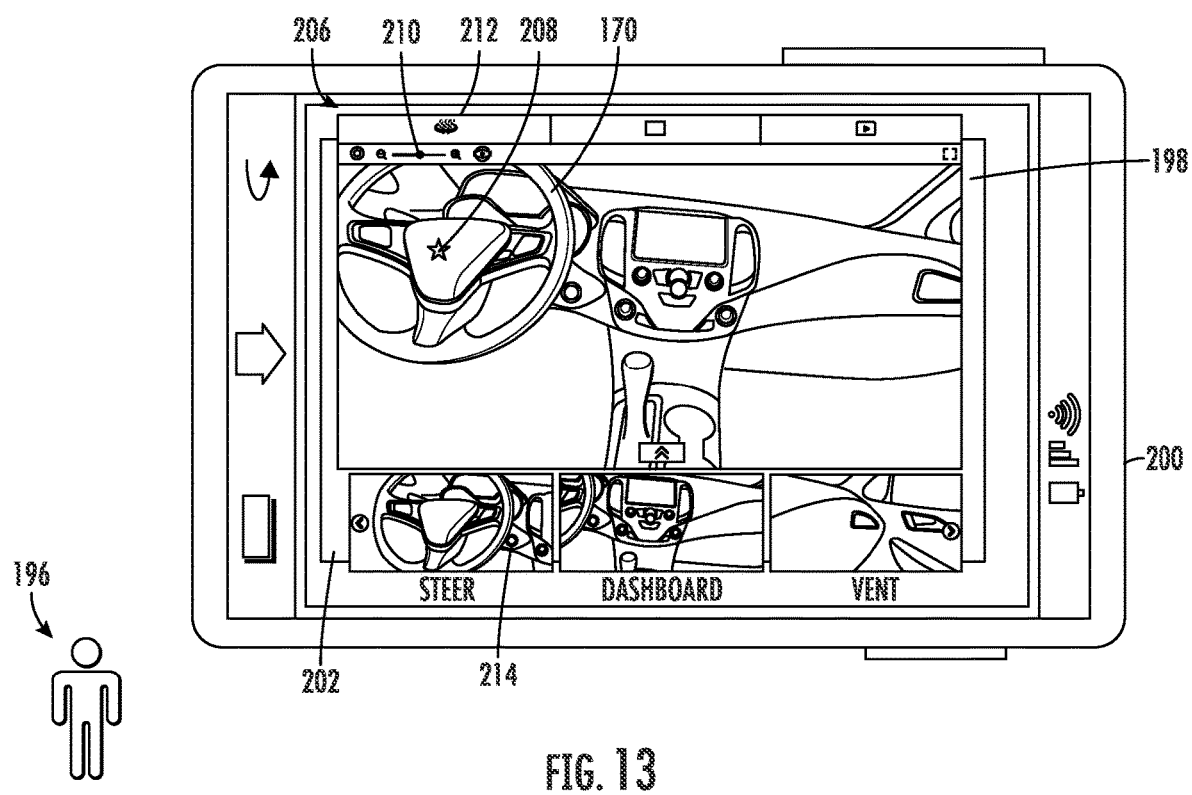
FIG. 13 is a display of an end user computing device displaying an interior 360 virtual photographic representation ("spin"), in accordance with one or more aspects of the present disclosure.
Figure 4:
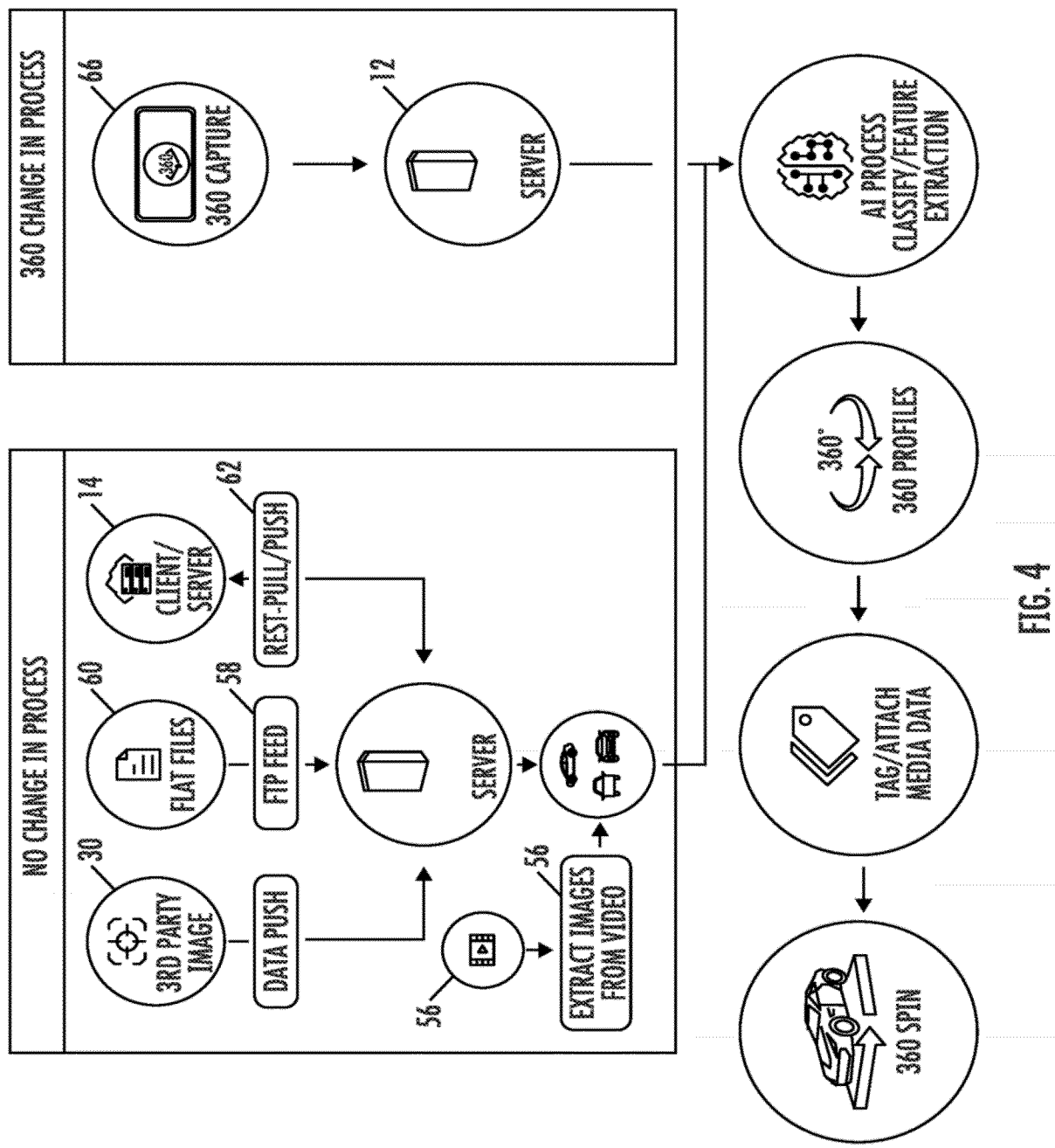

Although the foregoing embodiment explains a method for generating an exterior spin photograph 204 of an object 32 by circling the object 32 while capturing images 30, it is possible to capture images 30 to generate interior spin photographs 206. FIGS. 1, 6, 8, and 12-13. To produce interior spin photographs 206 dealer 28 enters vehicle 40 and begins capturing images while rotating camera 36 of mobile phone 34 around an interior of vehicle 40. Images 30 captured in this manner are provided to ISS 12 and processed by machine classification module 74 in a manner such as that described above, but since the camera 36 was rotated on an axis inside vehicle instead of moved around the entire exterior of vehicle 40, the resulting spin photograph is an interior spin photograph 206, rather than an exterior spin photograph 204. As shown in FIG. 13 end users 196 may display interior spin photographs 206 on displays 198 of their computing devices 200, and manipulate spin interior photographs 206 with a touchscreen 202, touchpad, mouse, or any device known in the art similarly to how they manipulate exterior spin photographs 204. The system may also add hotspots 170 and alternative backgrounds to interior spin photographs 206 in a manner such as that described above. End users may also select hotspots 170 on interior spin photographs 206 to obtain additional information regarding various features associated with interiors of vehicles 40. Display of interior spin photographs 206 may also be associated with markers 208 designating hotspots 170, image magnification 210, an automatic spin rotation button 212, and callout screens 214 highlighting currently visible portions of interior spin photograph 206 associated with hotspots 170.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A method for generating an interactive rotatable spin presentation of an object, the method comprising:
 capturing a plurality of images of an object, wherein the plurality of images comprises:
  a. a first image of the object taken from a first angle;
  b. a second image of the object taken from a second angle, wherein the first angle is different than the second angle;
 receiving a first set of data related to a first plurality of features by a machine-learning service, wherein the first set of data comprises the first image;

determining a first feature in the first plurality of features based on the first set of data using the machine-learning service;
generating a first output by the machine-learning service performing a machine-learning operation on the first feature of the first plurality of features, wherein the machine-learning operation is an operation of using the first feature to identify the object within the first image;
determining a second feature in the first plurality of features based on the first set of data using the machine-learning service;
generating a second output by the machine-learning service performing a machine-learning operation on the second feature of the first plurality of features, wherein the machine-learning operation is an operation of using the second feature to identify the object within the first image;
sending the second output from the machine-learning service;
providing an image classification list having a plurality of image classifications;
sending the first output from the machine-learning service;
automatically associating the first output and the second output with a first image classification selected from the image classification list;
automatically associating the first image with the first image classification;
receiving a second set of data related to a second plurality of features by a machine-learning service, wherein the second set of data comprises the second image;
determining a third feature in the second plurality of features based on the second received data using the machine-learning service;
generating a third output by the machine-learning service performing a machine-learning operation on the third feature of the second plurality of features, wherein the machine-learning operation is an operation of using the third feature to identify the object within the second image;
sending the third output from the machine-learning service;
determining a fourth feature in the second plurality of features based on the second set of data using the machine-learning service;
generating a fourth output by the machine-learning service performing a machine-learning operation on the fourth feature of the second plurality of features, wherein the machine-learning operation is an operation of using the fourth feature to identify the object within the second image;
sending the fourth output from the machine-learning service;
automatically associating the third output and the fourth output with a second image classification selected from the image classification list;
automatically associating the second image with the second image classification;
automatically using the first image classification associated with the first image and the second image classification associated with the second image to associate the first image and the second image in a predetermined sequence;
automatically combining the first image with the second image in the predetermined sequence to create a spin;
displaying the spin on a display; and
manipulating the spin on the display from a first perspective of the object to a second perspective of the object.

2. The method for generating an interactive rotatable spin presentation of an object of claim 1, further comprising:
automatically segmenting the first image to create a first segmented image comprising at least a portion of the object in the first image isolated from at least a portion of a background of the first image;
automatically segmenting the second image to create a second segmented image comprising at least a portion of the object in the second image isolated from at least a portion of a background of the second image; and
wherein automatically combining the first image with the second image to create the spin comprises automatically combining the first segmented image with the second segmented image to create the spin.

3. The method for generating an interactive rotatable spin presentation of an object of claim 1, further comprising:
automatically analyzing the first image to determine a first feature identification associated with a first feature associated with the object, wherein the first feature identification is selected from a predetermined plurality of feature identifications;
automatically analyzing the second image to determine a second feature identification associated with a second feature associated with the object, wherein the second feature identification is selected from the predetermined plurality of feature identifications;
automatically associating a first hotspot with the first feature;
automatically adding the first hotspot to the spin at a location associated with a representation of the first feature in the spin;
wherein the first hotspot is associated with a first media element;
selecting the first hotspot in the spin;
automatically displaying the first media element in response to selecting the first hotspot in the spin;
automatically associating a second hotspot with the second feature;
automatically adding the second hotspot to the spin at a location associated with a representation of the second feature in the spin;
wherein the second hotspot is associated with a second media element;
selecting the second hotspot in the spin; and
automatically displaying the second media element in response to selecting the second hotspot in the spin.

4. The method for generating an interactive rotatable spin presentation of an object of claim 3, wherein automatically adding the first hotspot to the spin at a location associated with a representation of the first feature in the spin comprises using the feature identification to identify the first hotspot to add to the spin at the location associated with the representation of the first feature.

* * * * *

UNITED STATES PATENT AND TRADEMARK OFFICE
CERTIFICATE OF CORRECTION

PATENT NO. : 11,488,371 B2
APPLICATION NO. : 17/125271
DATED : November 1, 2022
INVENTOR(S) : Sudheer Kumar Pamuru It is certified that error appears in the above-identified patent and that said Letters Patent is hereby corrected as shown below:

On the Title Page

Please replace the illustrative print figure, Fig. 4, as shown on the attached drawing sheet.

In the Drawings

Please delete drawing sheet 4, Fig. 4 and insert therefor drawing sheet 4, Fig. 4, as attached.

Signed and Sealed this
Seventh Day of May, 2024

Katherine Kelly Vidal
*Director of the United States Patent and Trademark Office*